Dec. 26, 1933.  W. B. PAYNE  1,941,318

COMBINED CHECK WRITING AND COMPUTING MACHINE

Filed May 6, 1929   6 Sheets-Sheet 1

INVENTOR
WALTER B. PAYNE
BY
Crumpston & Griffith
ATTORNEYS

Dec. 26, 1933.  W. B. PAYNE  1,941,318
COMBINED CHECK WRITING AND COMPUTING MACHINE
Filed May 6, 1929   6 Sheets-Sheet 3

INVENTOR
WALTER B. PAYNE
BY
ATTORNEYS

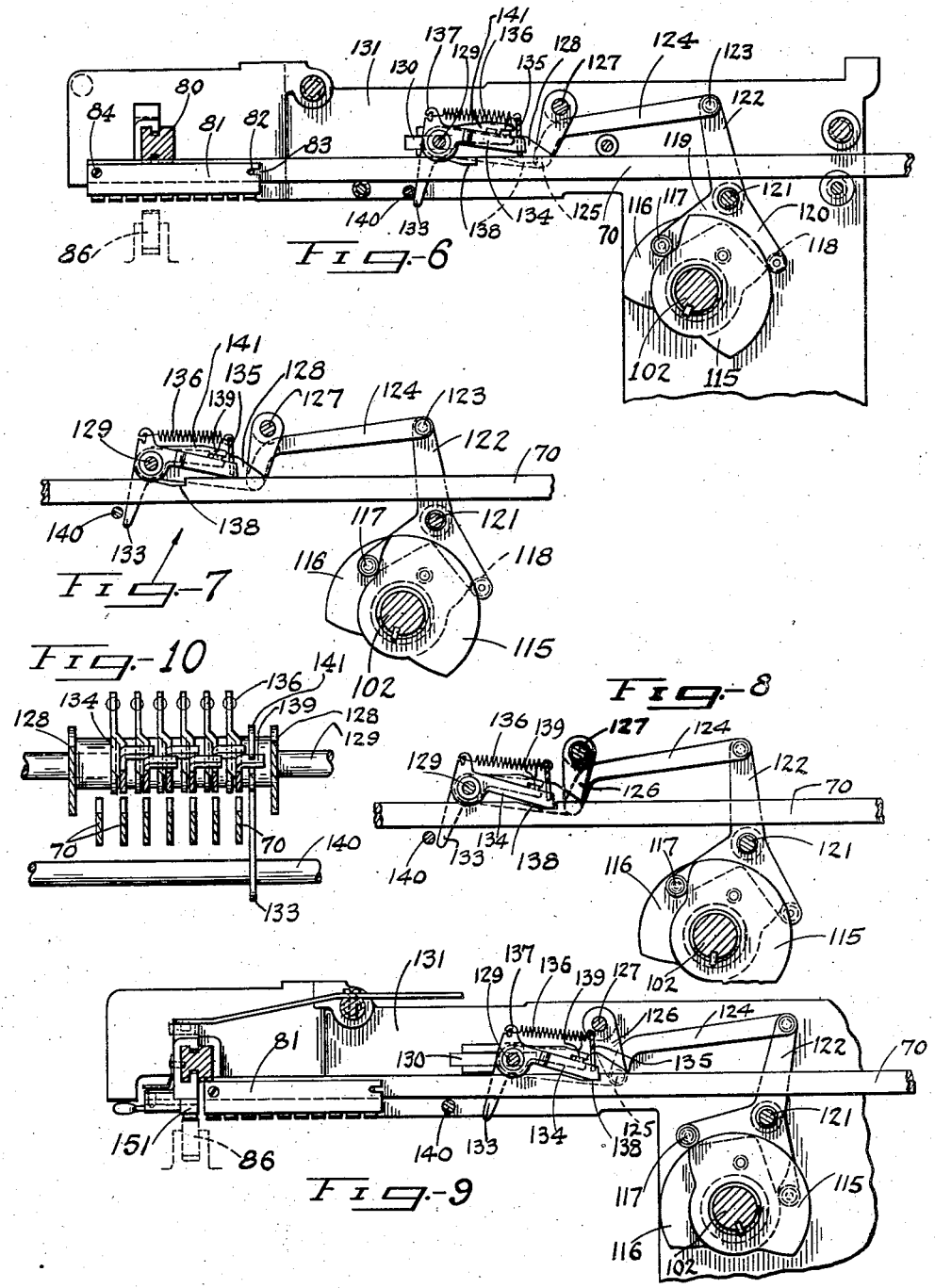

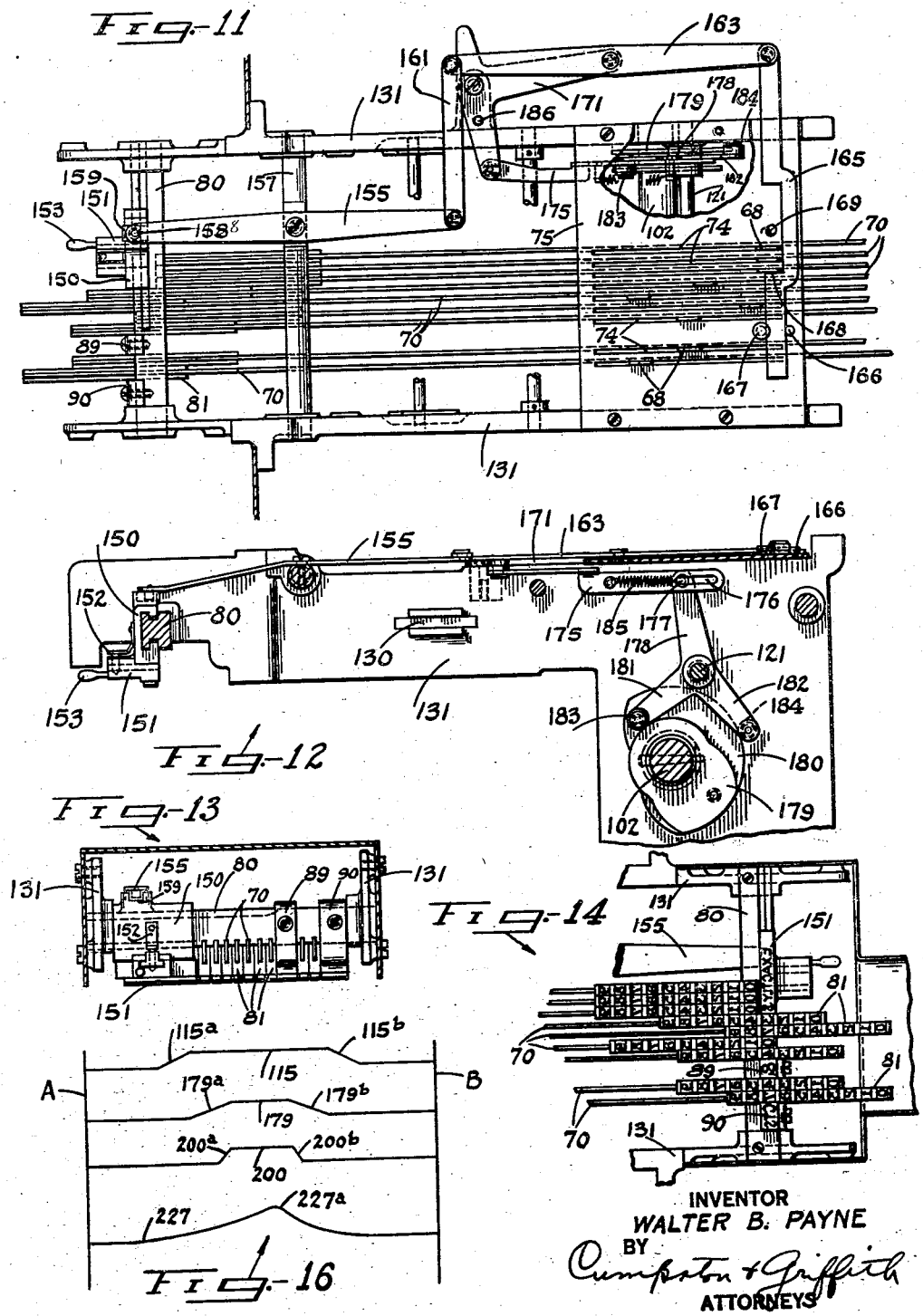

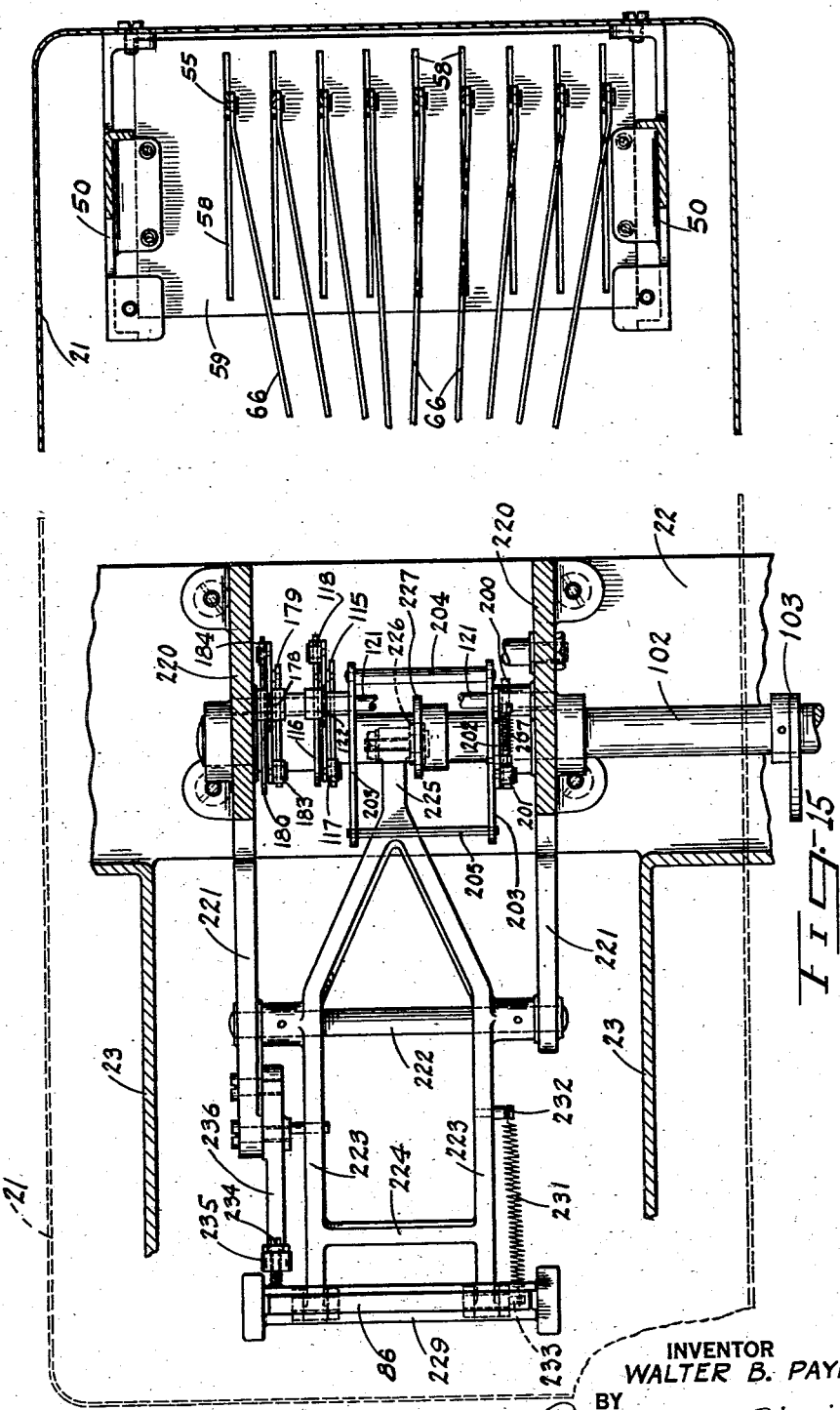
Dec. 26, 1933.    W. B. PAYNE    1,941,318
COMBINED CHECK WRITING AND COMPUTING MACHINE
Filed May 6, 1929    6 Sheets-Sheet 6
INVENTOR
WALTER B. PAYNE Patented Dec. 26, 1933

1,941,318

UNITED STATES PATENT OFFICE 1,941,318

COMBINED CHECK WRITING AND COMPUTING MACHINE

Walter B. Payne, Rochester, N. Y., assignor to The Todd Company, Inc., Rochester, N. Y., a corporation of New York Application May 6, 1929. Serial No. 360,889

19 Claims. (Cl. 101—93)

This invention relates to apparatus for printing amounts or other items upon checks, drafts, notes, and the like, such apparatus being commonly known as check writers. An object of the invention is to provide a generally improved, more satisfactory, and more durable construction of this nature than any heretofore known.

Another object of the invention is the provision of a simple, satisfactory, and relatively inexpensive construction embodying a check writer in combination with computing mechanism, so that the amounts of the checks, drafts, or other items being written by the check writer may be added up or may be subtracted from a bank balance or the like previously entered in the register of the computing mechanism.

Another object is the provision of such a combination of computing mechanism and check writing mechanism, so designed and constructed that the computing mechanism may comprise a known form of commercial computing machine readily obtainable on the open market. In this connection, it is also an object to design the parts so that few if any changes are necessary in the commercial computing machine, and so that the checkwriting mechanism may be applied easily and quickly to the computing machine.

Still another object is the provision of a combined checkwriting and computing structure which is light and compact, which is of neat and attractive appearance, and which may be adapted easily for use with sheets of several checks as well as with single checks.

Still another object is the provision of a combined structure in which the checkwriter does not interfere with the operation of the computing mechanism, thus allowing the latter to be operated when desired in the usual way, to add, subtract, take totals and sub-totals, and to list items, even though no checks are being written by the check writer.

A further object of the invention is the provision of a combined structure in which checks may be written by the checkwriter without corresponding actuation of the register of the computing machine, so that, for example, a spoiled check may be duplicated without running the amount of the check twice into the register, which would result in an incorrect balance on the register.

A further object is the provision of means for increasing the motion of certain parts of the computing machine so that the type members of the checkwriter may be moved through greater distances than the corresponding parts of the computing machine, and may thus be enabled to print upon the check in relatively large characters.

A further object is the provision of simple and satisfactory mechanism for preventing printing upon a check of zeros or other unnecessary characters in denominations above that having the first significant character, and the provision of improved and simplified mechanism for positioning a prefix character to print adjacent the highest significant digit of the amount.

A still further object of the invention is the provision of removable type members so formed that they may be attached and detached easily and quickly, and without dismantling other parts of the apparatus.

To these and other ends the invention resides in certain improvements and combinations of parts, all as will be hereinafter more fully explained, the novel features being pointed out in the claims at the end of this specification.

In the drawings:

Fig. 5 is a fragmentary vertical section along the line 5—5 of Fig. 4, illustrating details of the construction;

Fig. 6 is a fragmentary elevation, partly in section, of the mechanism for retracting the types in denominations above the highest significant digit, showing this mechanism in its normal position;

Fig. 7 is a view of parts shown in Fig. 6, illustrating the retracting mechanism cooperating with a type bar which has been moved to print a significant digit, the retracting mechanism accordingly being ineffective to retract such bar;

Fig. 8 is a view similar to Fig. 7 showing the retracting mechanism cooperating with a type bar in zero position, the retracting mechanism being in engagement with the type bar and ready to retract it to a non-print position;

Fig. 9 is a similar view showing the type bar fully retracted to non-print position by the retracting mechanism;

Fig. 10 is a transverse sectional view across the type bars and the dogs of the retracting mechanism, substantially on the line 10—10 of Fig. 3;

Fig. 11 is a plan of parts of the apparatus, with parts removed, illustrating especially the mechanism for positioning the prefix character;

Fig. 12 is a side elevation of part of mechanism shown in Fig. 11, illustrating the actuating cams for the prefix character;

Fig. 13 is a front elevation showing the ends of the type bars and the prefix character, with parts of the casing in section;

Fig. 14 is a bottom plan or face view of the type members including the prefix character;

Fig. 15 is a horizontal section taken substantially along the line 15—15 of Fig. 3, and Fig. 16 is a diagram illustrating the operating cycles of various cams used in the apparatus.

Similar reference numerals throughout the several views indicate the same parts.

Figure 1:
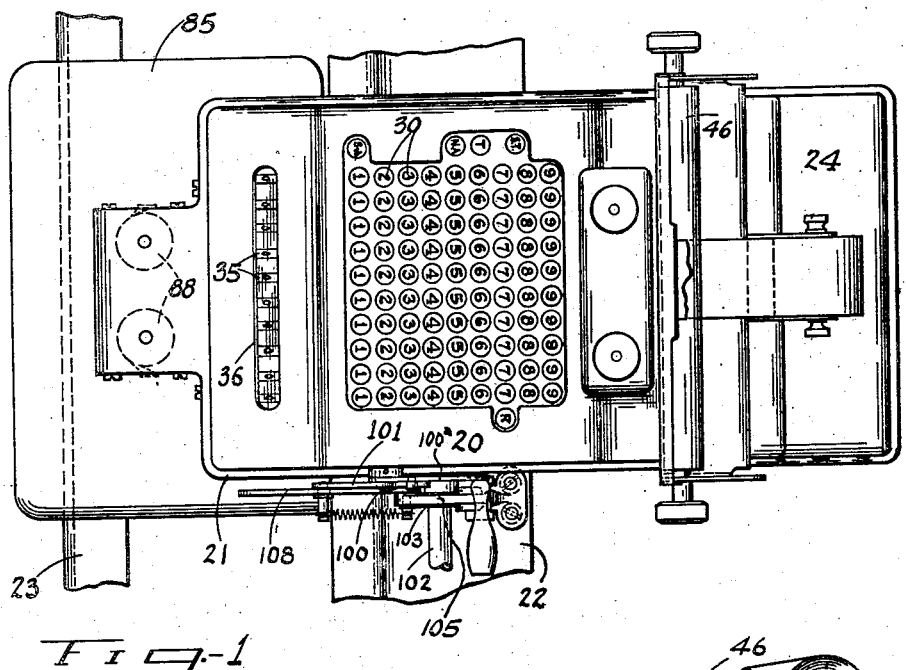
Fig. 1 is a plan of a preferred embodiment of a combined checkwriting and computing machine structure.
Figure 2:
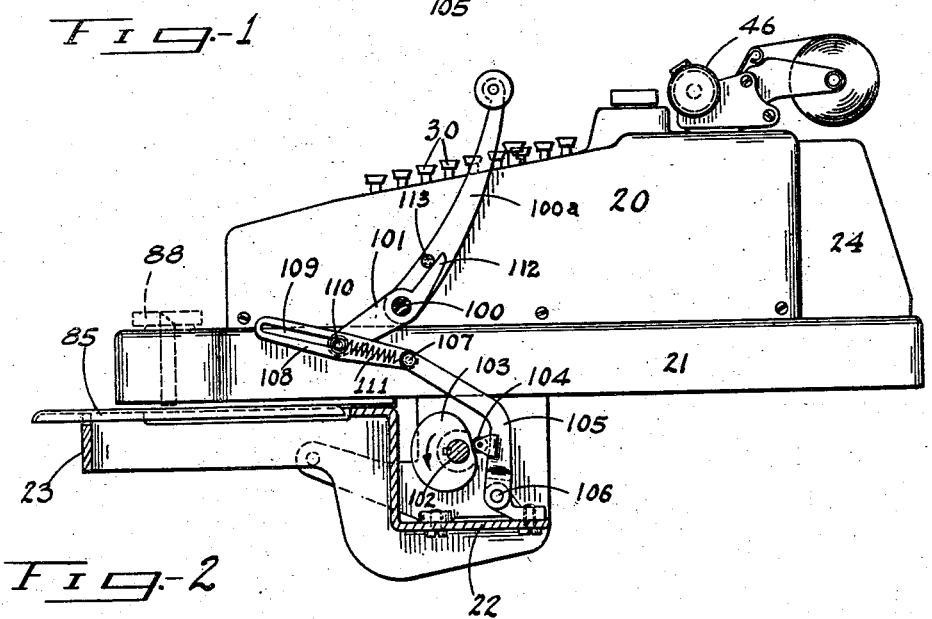
Fig. 2 is a side elevation thereof, with parts of the frame in section.

Referring now to the drawings, and especially to Figs. 1 and 2, there is shown a computing machine the casing of which is indicated at 20, this computing machine resting upon a casing 21 which contains the major portion of the checkwriting mechanism, all being supported by a Z-shaped transversely extending frame member 22 and a transverse bar 23. An extension or housing 24 at the rear of the computing machine casing 20 contains part of the mechanism, especially the connections for transmitting motion from the computing machine to the checkwriter.

Computing machine

The computing machine is preferably of any suitable known form currently manufactured and obtainable on the open market at a reasonable price. For example, it may be substantially of the form shown in the United States patent to Oliver D. Johantgen, No. 1,336,840, dated April 13, 1920. Reference is made to this patent for a complete disclosure of the details of the computing machine, only sufficient details being illustrated in this application to show the cooperation with the checkwriting mechanism.

Figure 3:
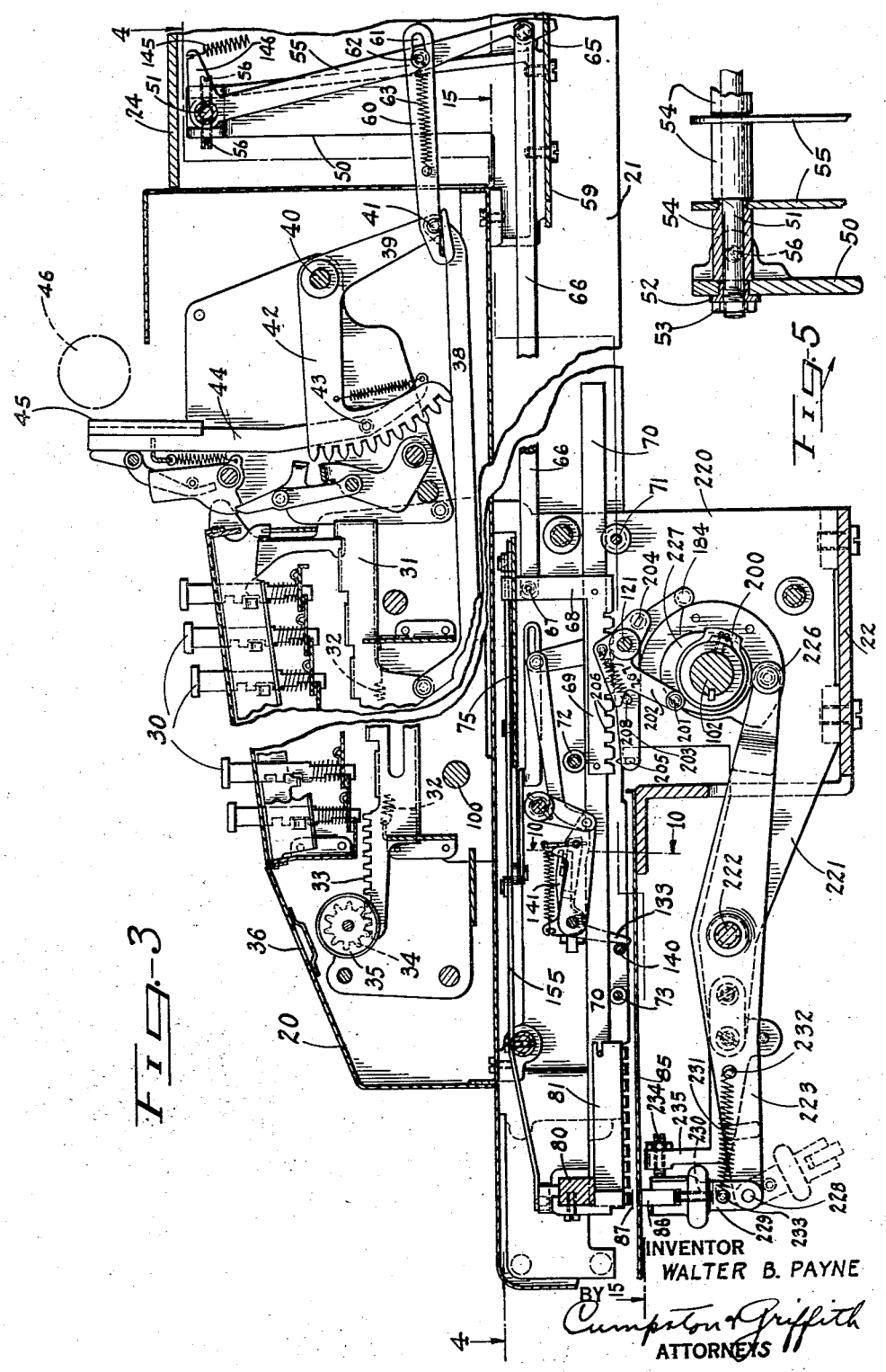
Fig. 3 is a vertical longitudinal section through the apparatus.

Referring now to Fig. 3, the computing machine comprises setting instrumentalities such as the keys 30 arranged in banks or denominations, there being nine keys numbered from 1 to 9 in each bank, and there being as many banks or denominations as may be desired according to the intended capacity of the machine. The lower ends of the keys when depressed form stops in the path of lugs on denominational members such as the bars 31, there being one bar for each denomination or bank of keys. These denominational members 31 tend to move forwardly under the influence of resilient means such as the springs 32, but are normally latched in rearward position so that such forward movement is prevented.

When the machine is operated, keys corresponding to the significant digits of the amount to be set up are depressed in the appropriate banks or denominational rows of keys (no keys being depressed for zeros), and the mechanism holding the denominational members is released, so that these members move forwardly under the influence of the springs 32 until a lug on each member comes into contact with the depressed key of the corresponding denomination, thus preventing further movement. If the "1" key has been depressed, the denominational member 31 will be permitted to move only through one step or increment of motion before it is stopped, while if the "9" key has been depressed, the denominational member will move forwardly through its full extent of nine steps or increments of motion, and the depression of any intermediate key between 1 and 9 will result in corresponding motion of the denominational member. When zero is the digit to be set up in any particular denomination, no key is depressed in that denomination, and the corresponding denominational member does not move forwardly at all.

During the motion of the denominational members, rack teeth 33 formed on the forward ends of the denominational members cooperate with pinions 34 associated with numeral wheels 35 of the registering mechanism of the computing machine, to add or subtract as the case may be, all as is brought out more fully in the above mentioned patent to Johantgen. The totals or balances standing on the register wheels 35 at any time may be read through a sight opening 36 in the casing.

The motion of the denominational members 31 is transmitted through links 38 to arms 39 of bell cranks pivoted on a transverse shaft 40, the links 38 being connected to the arms 39 by pivot studs 41. These bell cranks form part of the so-called listing mechanism of the computing machine, which it is not necessary to describe here further than to say that the other arms 42 of the bell cranks are pivotally connected at 43 to type bars 44 carrying type elements 45 arranged to cooperate with a platen 46 to print the numbers run into the register, and likewise to print totals, subtotals, or other numbers when desired. The increments of motion of the type bars 44 are relatively small and the numerals printed by the types 45 are likewise relatively small, and are not at all suitable for printing amounts upon checks or the like, since such amounts should preferably be printed in relatively large and conspicuous characters.

The present invention provides checkwriting mechanism associated with and under the control of the computing machine briefly described above, the checkwriting mechanism being arranged to print upon checks or the like in relatively large characters, the amounts printed being determined or controlled by the setting of the setting instrumentalities 30 of the computing machine.

Connections from computing machine to checkwriter

The studs 41 forming the pivotal connections between the links 38 and the arms 39 of the bell cranks provide a convenient place at which to connect the checkwriting mechanism to the computing machine. The extents of motion of these studs are the same as those of the corresponding denominational members 31, however, and as such extents of motion are relatively small, they must be stepped up or increased in order to obtain a sufficient range of motion to permit the checkwriter to print in relatively large characters. To this end, a lever system is employed for increasing the motion of the studs 41.

Figure 4:
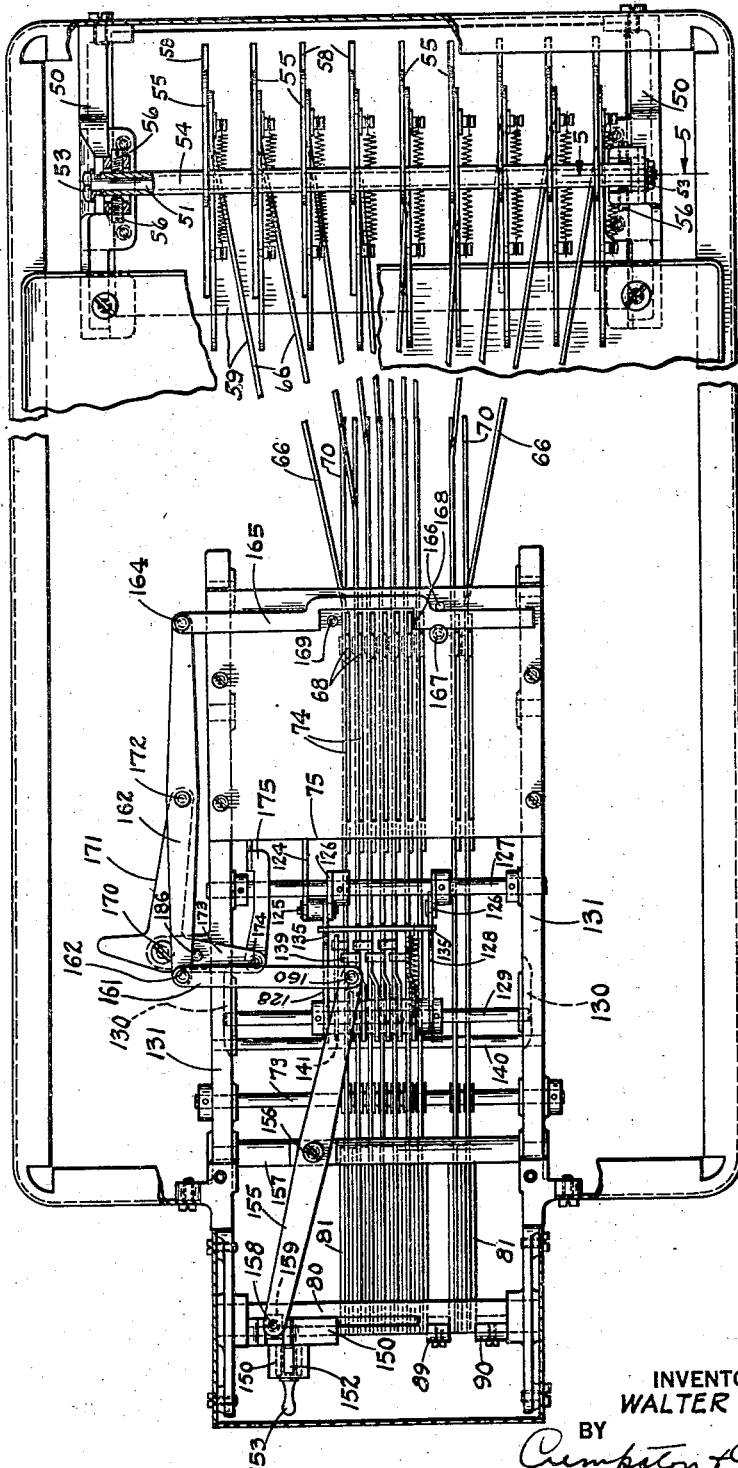
Fig. 4 is a horizontal section taken substantially along the line 4—4 of Fig. 3.

As is best shown in Figs. 3, 4, and 5, brackets or standards 50 support a horizontal shaft 51 extending transversely across the apparatus within the housing 24, the ends of the shaft being received in horizontal slots in the brackets 50, so that the shaft may be moved slightly forwardly or rearwardly for adjustment. The slots in the standards 50 are of greater width than the diameter of the shaft 51, so that these slots may receive reduced portions of bushings 52 placed on the shaft, the enlarged ends of the bushings contacting with the outer surfaces of the standards 50 as shown clearly in Fig. 5. Nuts 53 threaded on the ends of the shaft 51 may be tightened to press against the bushings and to hold the shaft in place.

A series of sleeves 54 is placed on the shaft 51 with the sleeves in abutting relation, each sleeve being reduced at one end to form a bearing for a lever 55, the reduced portion being of slightly greater length than the width of the lever so that the sleeves do not bind upon the levers no matter how tightly they may be clamped by the nuts 53. Adjusting screws 56 contact with the front and back of the end sleeves 54 and provide means for obtaining a fine adjustment of the shaft 51 forwardly or rearwardly in the slots of the standards 50 in which it is mounted.

Each of the levers 55 thus pivoted on the sleeve 54 on the shaft 51 is arranged to oscillate in a vertical plane and has a lower end engaged in a guiding slot 58 (Figs. 4 and 15) in a guiding plate 59 extending across the apparatus. This arrangement guides the levers 55 accurately and prevents them from wabbling sideways. One of these levers 55 is associated with and lies substantially in the vertical plane passing through each of the denominational members 31, except that, if desired, no levers 55 need be provided for the members 31 of the highest one or two denominations, since the checkwriter would doubtless never be required to print an amount having as many digits as the full capacity of the computing machine.

Links 60, as best shown in Fig. 3, are connected at their forward ends to the pivot studs 41, the links preferably being so formed that they may be slipped over the studs and held in place by slightly bending the hook-shaped ends of the links, without the necessity of changing the studs or altering other parts of the computing machine in any substantial manner. These links 60 have slots 61 at their rear ends, which slots slidably receive pins 62 on the levers 55. Springs 63 connected at their rear ends to the pins 62 and at their forward ends to fixed pins on the links 60, tend to draw the studs 62 forwardly, and thus keep these studs normally at the forward ends of the slots 61 although permitting the studs to move backwardly in these slots when certain type members are to be retracted in a manner described below. These springs 63 are stronger than the springs 32 of the computing machine, so that in case the forward motion of the levers 55 is accidentally obstructed for any reason, the motion of the denominational members 31 will be stopped at the same point, and thus the computing machine will register and list the same number actually printed by the checkwriter, which will prevent a discrepancy between the amount of the check and the amount registered and listed by the computing machine.

*Checkwriter mechanism*

The studs 62 are at intermediate points on the levers 55, between the fulcrums of these levers and the free or lower ends thereof. Near their lower ends, the levers 55 are pivotally connected at 65 to links 66 which extend forwardly and which are pivoted at 67 to upstanding arms 68 of L-shaped plates having horizontal arms 69. These horizontal arms 69 are secured to horizontally extending bars 70 which may be termed type bars, since they carry or support the types or type elements which do the actual printing upon the check. The type bars 70 are suitably guided for longitudinal motion and prevented from lateral displacement by stepped or recessed bushings on shafts 71, 72, and 73 extending across the apparatus, and the upper ends of the upstanding arms 68 of the L-shaped plates are likewise guided by extending upwardly through slots 74 in a plate 75, best shown in Fig. 11. The ends of the members 68 project slightly upwardly beyond the top surface of the plate 75, to act as abutments or stop members for the prefix character positioning mechanism as will be described below.

The levers 55 are arranged at the same distance apart as the denominational members 31, while the type bars 70 are spaced considerably closer together, so that the numerals printed upon the checks will be comparatively close to each other, without blank spaces between them. The relative spacing of the levers 55 and of the type bars 70 is best shown in Fig. 4, which also illustrates the fact that certain of the links 66 connecting the levers to the type bars extend obliquely or at an angle, converging from the levers to the type bars in order to transfer the motion of the relatively widely spaced levers to the relatively closely spaced type bars.

It will be seen from the foregoing description that the type bars 70 are connected to move in accordance with the movements of the denominational members 31, but that the type bars are moved through greater distances than the denomination members on account of the lever system employed, which serves to increase or multiply the motion of the denominational members and to transmit the multiply motion to the type bars 70.

The upper edges of the type bars 70, near their forward ends, are guided in notches cut in the lower face of a transverse bar 80, best shown in Figs. 3 and 13, and the type bars carry at their forward ends suitable type members or printing elements 81.

*Printing elements of checkwriter*

These type members or elements are preferably of U-shaped cross section so that they fit over the bottoms of the type bars 70 and extend partially up the sides of the bars, as shown for example in Figs. 3, 6, and 13. The bottom surfaces of the members 81 have printing characters formed thereon, these characters preferably comprising the digits from 0 to 9 inclusive, as shown in Fig. 14, which is a view showing the bottom or printing faces of these type members 81.

The type members sometimes become worn or broken so that it is necessary to replace them. Accordingly, they should be made removable from the type bars 70. Furthermore, they should preferably be so constructed that they may be removed and replaced easily without dismantling other parts of the machine. To this end, the type members are held in place on the type bars by means of a pin 82 (Fig. 6) projecting from the side of each type bar 70 in position to be received by a notch 83 in the inner end of the type member 81. The outer or forward end of each type member 81 is secured to the type bar by any suitable easily removable means such as a screw 84. From this construction, it follows that the screw 84 on any selected type member may be removed easily by first shifting the type bar as far forward as possible, to its "9" position, and then after the screw is removed the type member may be slid longitudinally forwardly relative to the type bar 70, which will disengage the pin 82 from the notch 83 and completely free the type member from the type bar. The screw 84 at the front end of each type member is rendered readily accessible by moving the type member to its extreme forward position as above mentioned, and accordingly the screw may be taken out without taking apart the casing of the machine or otherwise dismantling it. The rear end of the type member always remains more or less inaccessible within the casing, but because of the sliding pin and slot connection used at this rear end, it is not necessary to obtain access to the rear end in order to remove the type element or replace it on the type bar.

The printing characters formed on the bottom surfaces of the type elements 81 are larger than those on the printing types 45 of the listing mechanism of the computing machine, such larger characters being possible because of the increased extents of movement which the type members 81 have in comparison to the lesser movement of the printing types 45.

The type members 81 are arranged to print conveniently upon a check, draft, or similar instrument. The sheet on which the printing is to be done is slid under the type and supported by a plate 85 (Figs. 2 and 3) which has an aperture therein substantially beneath the cross bar 80. The supporting plate 85 may be arranged to receive single checks, or the plate and associated parts may be slightly altered to accommodate sheets of several checks. A platen 86 (Fig. 3) is actuated by suitable mechanism hereafter described which causes it to rise during each printing operation through the aperture in the plate 85 and to press the sheet of paper upwardly into contact with an inking ribbon 87 positioned just beneath the type elements 81, as shown in Fig. 3. The ribbon 87 may be guided by suitable guides and wound and unwound upon ribbon spools 88 shown in Fig. 1. If preferred, any other suitable means may be employed for inking the printing types or otherwise causing ink to be applied to the check at each printing operation.

It will be understood, of course, that the platen 86 is sufficiently narrow so that it presses the paper against only one printing character on each of the type members 81. The particular character which overlies the platen 86 is determined by the longitudinal position of the type bar 70, which, in turn, is determined by the position of the denominational member 31, controlled by the setting instrumentalities 30. For example, if the "3" key in any particular row or denomination of the keys 30 is depressed, the corresponding denominational member 31 will be allowed to move forwardly three steps from its normal or zero position upon the next actuation of the mechanism, and this will cause corresponding forward movement through three steps of the corresponding type bar 70 and printing member 81. Normally the "0" character of the type member 81 is over the platen 86, and this forward movement of three steps will shift the "1" and "2" characters past the platen and bring the type member to rest with the "3" character on the type member 81 directly above the platen 86. Subsequent upward movement of the platen will press the paper against this character (or rather, against the ribbon beneath this character) and will thus cause the numeral 3 to be printed on the check or other piece of paper.

Thus each type member 81 will be positioned to print the character corresponding to the depressed key 30 in the same denomination. Accordingly, the various keys in different denominations may be set so as to cause any desired number of one or several digits to be set up in printing position, subsequent movement of the platen 86 being effective to impress such number on the paper.

It may be mentioned here that there is a somewhat greater space between the type bar 70 of the next to the lowest denomination and the type bar of the third from the lowest denomination than there is between other adjacent type bars. This extra spacing serves to separate the digits representing dollars from those representing cents, thus avoiding any possibility of confusion between the dollars and the cents. Any suitable sign or character is preferably printed in this space between the unit of dollars and the tens of cents, such character in the present embodiment being the ampersand or "&" sign. This character is formed on the bottom of a type member 89, best shown in Figs. 11, 13, and 14, which is mounted on and depends from the cross bar 80. Obviously the type member 89 may be arranged to print the word "and" instead of the ampersand sign, though a slightly greater space would then be necessary between the units of dollars and the tens of cents.

To the right of the units of cents there is preferably another printing type 90 somewhat similar to the type 89 and likewise depending from the cross bar 80. This type 90, as shown in Fig. 14, is arranged to print the letters "cts" but it may be formed so as to print the word "cents" or any other desired sign or character.

To the left of the type bar of highest denomination there is a so called prefix character 151 which, upon each actuation of the machine, is brought into juxtaposition to the type member of the highest denomination which is set to print a significant figure, so that no blank space will be left on the check between the matter printed by this prefix character and the numerals representing the amount of the check, in case the number of denominations to be printed is less than the number of type bars. The matter printed by the prefix character preferably consists of "EXACTLY $" although any other suitable characters may be employed. This prefix character and the mechanism for shifting it are described in detail hereafter, and are mentioned in passing at this point only in order to give a complete picture of the matter printed upon the check.

*Driving means for computing machine*

In the commercial computing machine here illustrated, and described in detail in the patent to Johantgen above mentioned, the denominational members 31 normally stand in what might be termed a zero position, and if no key is depressed in any particular denomination, the member 31 in that denomination remains in such zero position during the operation of the machine. If any key is depressed, however, the denominational member 31 moves forwardly from its zero position a number of steps or increments corresponding to the number of the depressed key; for instance, the bar 31 would move forward four steps if the "4" key were depressed, and would move forward seven steps if the "7" key were depressed. The movement of the denominational member does not occur immediately upon the depression of a key, but is controlled by the subsequent operation of a handle designated 80 in the drawings of the Johantgen patent, which handle is mounted on the main shaft 82 of the machine. This same main shaft is designated by the numeral 100 in Figs. 2 and 3 of the present drawings, and the operating handle is shown at 100a (Figs. 1 and 2).

The combined check writing and computing machine of the present invention is preferably driven by a power shaft 102 connected to a suitable motor through a single revolution clutch, which is arranged upon actuation of a suitable latch or trip to rotate the shaft 102 through one revolution in a counter-clockwise direction when viewed as in Fig. 2, and then to stop it until the latch or trip is again actuated. A cam 103 keyed to this power shaft 102 cooperates with a follower roller 104 on a lever 105 pivoted at 106 to a bracket mounted on the Z-bar 22. The free end of the lever 105 is pivoted at 107 to a link 108 having a slot 109 which receives a pin 110 on the end of an arm 101 loosely pivoted on the outer end of the main shaft 100 of the computing machine. An extension 112 on the arm 101 contacts with the rear side of a pin 113 on the handle 100a, so that counter-clockwise oscillation of the arm 101 will correspondingly oscillate the handle 100a and actuate the mechanism. The handle 100a is free to be pulled forward at any time to operate the computing mechanism, however, without causing movement of the arm 101. A spring 111 connected to the pin 110 at one end and to the pivot 107 at the other end, as shown clearly in Fig. 2, normally keeps the pin 110 at the inner end of the slot 109 but provides a resilient connection so that the link 108 may continue through its normal movement without actuating the arm 101 in case parts of the computing machine should become accidently jammed or locked. This avoids the possibility of breaking the computing machine in case it jams.

*Type bar retracting mechanism*

It has been mentioned above that the denominational members 31 of the computing machine stand normally in zero position and move from this position through distances controlled by the keys 30. The movements of the denominational members away from zero position are always in one direction; the members are not capable of being retracted from zero position to what might be termed a sub-zero position.

Since the positions of the type members 81 of the checkwriting mechanism correspond normally to the position of the denominational members 31, it follows that when any denominational member 31 remains in zero position, the type member 81 of the same denomination would likewise normally remain in zero position. This is quite satisfactory for those denominations below the highest denomination in which a significant digit is to be printed, but in the denomination above or to the left of the highest significant digit, it is preferable not to print zeros. Accordingly, mechanism is provided for retracting those type elements 81 above the highest denomination having a significant digit therein, this mechanism moving the type elements in a direction opposite to the direction of their normal setting up movement, so that these retracted type members are withdrawn from cooperation with the platen 86, and do not print. The retraction of the type members permits the prefix character to be shifted into the position vacated by the retracted type members, so that the prefix character will print adjacent the digit of highest denomination.

The mechanism for retracting the type members is best shown in Figs. 6 to 10 inclusive, and comprises a pair of cams 115 and 116 fixed to the power shaft 102 and slightly spaced from each other longitudinally of the shaft as indicated in Fig. 15. These cams cooperate with follower rollers 117 and 118 on arms 119 and 120 of a lever pivoted on a cross shaft 121. The lever is arranged in a plane between the two cams, and the follower roller 117 projects from the right hand side of the arm 119 of the lever to cooperate with the right hand cam 115, while the other roller 118 projects from the left hand side of the arm 120 of the lever to cooperate with the left hand cam 116.

The lever has an upwardly extending arm 122 pivotally connected at 123 to the rear end of a link 124, the forward end of which is pivoted at 125 to one of a pair of arms 126 fixed to a rock shaft 127 extending across the apparatus. Each of the arms 126 has pivoted thereto a forwardly extending link 128 (see Figs. 4 and 6 to 9 inclusive), the forward ends of these links 128 being pivoted on a cross shaft 129 having its ends slidably mounted in guiding grooves 130 formed longitudinally in frame members 131 of the checkwriting mechanism. Pivoted on this shaft 129 are several dogs 134 held in proper spaced relation by bushings or collars, one of these dogs being provided for each of the type bars 70 except the units of dollars type bar and the units and tens of cents type bars. No dogs are provided for the type bars of these lowest three denominations because it is preferred never to retract these three type bars to a non-print position. Even though the amount to be printed should be less than a dollar, it is preferred to print a zero in the units of dollars position.

Each of the dogs 134 pivoted on the shaft 129 extends in a rearwardly and downwardly inclined direction from the shaft 129, as shown in Figs. 4 and 10, and the rear extremity thereof lies in the same vertical plane as the type bar 70 with which the dog is associated. The rear ends of the dogs are guided for vertical movement in slots in a comb plate 135 secured at its ends to the links 128. Each dog is provided with a spring 136 connected at one end to an upstanding arm 137 on the dog and at the other end to the top of the comb plate 135, this spring tending to rotate the dog in a clockwise direction when viewed as in Figs. 6 to 9 inclusive, which tends to depress the free end or nose portion of the dog into contact with the top of the type bar 70.

Each of the type bars 70 (except those of the lowest three denominations) has a notch 138 formed in the upper edge thereof in position so that the rear edge of the notch, which is substantially vertical, is a short distance behind the effective end of the dog when the dog is in normal position and when the type bar is in zero position. Since the dogs are preferably all of the same size, their rear or effective ends are all in alinement with each other transversely of the apparatus, and accordingly the notches 138 in the type bars 70 are likewise in alinement with each other transversely of the apparatus whenever all of the type bars are in the same position, such as the zero position.

Each dog is provided with a lateral arm 139 extending over the dog of the next higher denomination, that is, the dog to the left. These lateral arms 139 are best shown in Figs. 4 and 10, and it will be apparent that when any dog is held up, all of the dogs of lower denominations or to the right of the dog held up will likewise be held up and prevented from descending, although dogs in higher denominations or to the left of the one held up will not be interfered with. These lateral arms 139 are provided for holding all of the dogs up at certain times, as explained below, and also so that the retracting mechanism will not interfere with the printing of zeros in denominations lower than the highest denomination having a significant digit.

A rod or bar 140 extends across the apparatus between the two frame members 131 in position to engage a downwardly extending tail 133 on a lever 141 pivoted on the shaft 129 just to the left of the dog 134 of highest denomination. This lever extends rearwardly alongside the dog 134 of highest denomination, and has a slot in its rear end which embraces the lateral arm 139 on this dog. Hence, when the tail 133 engages the rod 140 so as to hold the lever 141 up, this lever holds the dog 134 of highest denomination up, and this dog in turn holds all of the other dogs up out of contact with the type bars, by reason of the lateral arms 139 on the dogs.

This normal position of the parts of the retracting mechanism is illustrated in Fig. 6 although one of the type bars 70 has been moved forwardly from its normal position in this figure, which shows the shaft 129 at the forward extent of its movement, so that the rod 140 acts upon the tail 133 to hold the lever 141 in upward position, thus keeping all of the dogs 134 elevated slightly above the type bars 70. The power shaft 102 is shown turned slightly around from its normal position in which it rests between successive actuations, but has not yet turned sufficiently to cause the cams 115 and 116 to shift the lever 122 from its normal position. Also the type bar 70 has been moved forwardly to set it to a printing position, as above mentioned.

Continued rotation of the power shaft 102 in a counter-clockwise direction from the position shown in Fig. 6 will obviously cause the cams to turn the lever 122 in a clockwise direction, which will pull rearwardly on the link 124 and cause this link to rock the shaft 127 to pull rearwardly on the shaft 129. When this shaft 129 which carries the dogs is moved rearwardly, the tail 133 will be shifted away from the stop bar 140 so that the lever 141 will no longer hold the dogs upwardly, but on the contrary the springs 136 will be allowed to move the ends of the dogs down into the notches 138 or against the tops of the type bars if the notches have been displaced so that they are no longer beneath the ends of the dogs.

Fig. 6 shows a type bar which has been moved forwardly three steps into position so that it will print the numeral "3". This figure also illustrates in dotted lines the position which the notch 138 occupied when the type bar stood at normal or zero position, and in full lines the position of the notch when the type bar is moved to the "3" position. It is seen that when the type bar is in zero position, the end of the dog associated with this type bar can drop into the notch when the shaft 129 moves rearwardly, but that when the type bar is displaced to any other position such as the "3" position shown in this figure, the notch is no longer beneath the dog and the dog cannot drop into it.

Fig. 7 illustrates the same type bar 70 which has been set to the "3" position, but shows the power shaft 102 turned slightly farther around so that the roller 117 has begun to ride up the incline of the cam 115, thus moving the lever 122 to pull the shaft 129 rearwardly. The withdrawal of the tail 133 from the stop bar 140 has allowed the spring 136 to move the end of this dog downwardly, but such downward movement can proceed only until the end of the dog comes into contact with the upper edge of the type bar 70, since the notch 138 is displaced so that the dog cannot drop into it. Further rotation of the shaft 102 beyond the position shown in Fig. 7 will turn the lever 122 still more and pull the shaft 129 still further rearwardly, but this will simply result in sliding the end of the dog along the smooth top surface of the type bar 70 in contact therewith, without producing any effect upon the type bar.

In Fig. 8 there is shown a type bar 70 which remains set in zero position. Accordingly, the notch 138 of this type bar is in such position that the effective end of the dog may drop into the notch as the shaft 129 moves rearwardly. The rear vertical edge of the notch forms an abutment against which the end of the dog may press, so that when the shaft 129 continues its rearward movement, the resulting rearward movement of the dog will carry the type bar 70 rearwardly with it to a sub-zero position as illustrated in Fig. 9, in which the type member 81 on the type bar is completely withdrawn from above the platen, so that no character will be printed by this type member. Fig. 9 illustrates the parts at the completion of this rearward movement or retraction of the type bar. The power shaft 102 has turned so that the roller 117 has ridden up the incline of cam 115 and is now on the high portion thereof, while roller 118 has ridden down the incline of cam 116 and is on low portion thereof. The parts will remain in this same position during a substantial part of the continued rotation of the shaft 102, and finally, when the shaft nears the end of its single revolution, the roller 117 will ride down the cam 115 and the roller 118 will ride up the cam 116 so that the parts of the retracting mechanism will be returned substantially to the position shown in Fig. 6.

It has been mentioned heretofore that the denominational members 31 were incapable of movement in a reverse direction from their zero position, and could move only in one direction from this position. Accordingly, when any particular type bars 70 are retracted to sub-zero position, the denominational members 31 connected to those retracted type bars are unable to move rearwardly with the type bars, and it is for this reason that the resilient connection comprising the slot 61, pin 62, and spring 63 is provided. When a type bar 70 moves rearwardly to the sub-zero position, the lever 55 associated with this type bar likewise moves rearwardly but the link 60 is unable to move rearwardly because it is directly connected to the denominational member 31. Accordingly, the spring 63 stretches and the pin 62 moves rearwardly in the slot 61, thus permitting the retracting movement of the type bars to take place without damaging or straining the parts of the computing machine.

It may be emphasized here that the spring 63, while sufficiently resilient to permit this retracting movement, is nevertheless made stronger than the spring 32 which moves the denominational member 31 forwardly after the denominational member has been released by appropriate movement of the keys 30 and the operating shaft 100. From this it follows that if the motion of any type bar 70 should be accidently interfered with during the setting of the printing type so that the type bar did not move to the full extent allowed by the keys 30, the denominational member 31 would nevertheless be stopped at the same point; hence the amount run into the register 35 and printed by the listing type 45 would correspond with the amount printed on the check and there would be no discrepancy between them, even though the amount of the check is not the amount intended.

For instance, suppose the "4" key were depressed, but that some accidental obstruction interfered with the movement of the type bar 70 to its "4" position, and stopped the type bar at "3" position. If the spring 32 tending to move the denominational member 31 were stronger than the spring 63, it is apparent that the denominational member would continue to move to "4" position notwithstanding the stopping of the type bar 70 at "3" position, the additional step of movement of the denominational member being accomplished by stretching the spring 63 and drawing the link 60 forwardly relative to the pin 62. But since the springs 32 are not stronger but weaker than the springs 63, this undesired result cannot happen. The tension of the spring 32 will be insufficient to stretch the stronger spring 63, and accordingly the denominational member 31 will come to rest in the "3" position, which is the position in which the type bar was stopped by the accidental obstruction. Thus the numeral 3 will be printed on the check, and will likewise be printed by the listing type 45 and will be run into the register 35. While it is true that this numeral 3 is incorrect, and that the numeral 4 was the one intended to be printed, nevertheless it is deemed preferable to cause the register and the listing mechanism to make the same mistake made by the checkwriting mechanism, since the error may be detected more easily in this way than if the registering and listing mechanism functioned correctly and gave no indication that the checkwriting mechanism had functioned incorrectly.

At this point, while on the subject of springs, it may be mentioned that a spring 145 (Fig. 3) pulls downwardly on a rearwardly extending arm 146 on each of the levers 55, and thus tends to move the lever forwardly. This spring is made of sufficient strength to overcome the frictional and other resistance to movement of the various parts of the checkwriter which are shifted from the lever 55, so that the addition of the checkwriter to the computing machine imposes no additional load whatever on the springs 32. Hence these springs when used with a checkwriter need not be any stronger than the springs ordinarily supplied when the computing machine is to be used alone, and it is not necessary to alter the actuating mechanism of the computing machine in order to adapt it for use with a checkwriter.

Prefix character

After the type bars 70 in denominations above the highest significant digit have been retracted, a prefix character, briefly mentioned above, is shifted into a position to print adjacent the highest significant digit. The prefix character and the mechanism for actuating it are best shown in Figs. 4 and 11 to 14 inclusive. A slide member 150 is arranged to engage and slide along guiding slots in the top and bottom of the cross bar 80, and this sliding member 150 has removably attached thereto the prefix character type 151 which is normally held in place on the slide 150 by means of a spring detent 152 but which may be removed for repairs or replacement by pulling forwardly on a handle 153. The prefix character 151 carries on its lower face types for printing any desired symbols or characters, such as "EXACTLY $" as shown in Fig. 14. Normally, in its position of rest, the prefix character is leftwardly of the type member 81 of highest denomination, this normal position being shown in Figs. 4 and 13. All of the type bars are thus able to move forwardly to set them for printing any desired number. If the type bar of highest denomination has been set to print any significant digit, the prefix character remains substantially in its normal position, moving perhaps a very slight amount to bring it into contact with the type element on the highest type bar. If, on the other hand, the type bar of highest denomination remains at zero and is not moved to position to print a significant digit, then the retracting mechanism above described retracts this type bar to sub-zero position and the prefix character positioning mechanism moves the prefix character and its slide 151 rightwardly along the bar 80 into contact or substantially into contact with the type element on the second type bar, all of which movement takes place before the platen 86 is actuated to effect printing. Similarly, if the highest two type bars are not shifted from zero position to print effective digits, both of them will be retracted to sub-zero position and the prefix character positioning mechanism will then shift the prefix character through the space vacated by these two type bars and place it substantially in contact with the third type member. In a similar manner, no matter how many type bars of the higher denominations are retracted to sub-zero position, the prefix character positioning mechanism is arranged to move the prefix character automatically, prior to the printing operation, substantially into contact with the highest denomination type element which is not moved to sub-zero position.

Prefix character positioning mechanism

The prefix character positioning mechanism comprises a lever 155 pivoted at its center at 156 on a cross member 157 extending between the frame members 131. The forward end of the lever 155 is pivoted at 158 to a slide member 159 arranged to slide across the prefix character slide 150 in a direction transverse to the movement of this latter slide so as to allow for the arcuate movement of the end of the lever 155 in contrast to the rectilinear movement of the slide 150.

The rear end of the lever 155 is pivoted at 160 to a link 161 the opposite end of which is pivoted at 162 to one end of a lever 163. The other end of this lever 163 is pivotally connected at 164 to a feeling member or device 165 slidable across the top of the plate 75 and guided by a pin 166 and a headed stud 167. This feeling device is offset so as to provide a shoulder 168 which forms the effective feeling surface of this member 165. When the device is actuated, the shoulder 168 is arranged to move transversely across the top of the plate 75 along a path just behind the members 68 which project upwardly through the plate when the type bars on which these members 68 are mounted are in their zero positions as shown in Fig. 4. Hence when all of the type bars are in zero position or when they have been moved forwardly from zero position, the members 68 are not in the path of travel of the feeling device and this device is permitted to move through its full range of movement until the shoulder 168 comes into contact with a stop pin 169.

If, on the other hand, any of the type bars 70 have been retracted to sub-zero position, the tops of the members 68 of such type bars will be moved rearwardly from the position shown in Fig. 4 to a position in the path of travel of the shoulder 168 of the feeler member, so that they will obstruct this feeler member and stop its motion. Such a condition is illustrated in Fig. 11. where the highest three type bars 70 have been retracted, so that the shoulder 168 on the feeler 165 comes into contact with the right hand one of the three retracted members 68.

The lever 163 is pivoted or fulcrumed at its mid point 172 on the end of an arm 171 of a bell crank pivoted at 170 to a bracket on one of the frame members 131. Rotation of the bell crank in a counter-clockwise direction will move the fulcrum 172 of the lever 163 in a leftward direction, as will be obvious from Fig. 4.

The other arm 173 of the bell crank is pivoted at 174 to a link 175 which extends rearwardly to a point approximately above the power shaft 102 and is there provided with a slot 176 which receives a pin 177 on an upstanding lever arm 178 pivoted on the same shaft 121 on which the lever 122 is pivoted, Fig. 12. This lever 178 is in a vertical plane between two slightly spaced cams 179 and 180 on the power shaft 102, and the lever has arms 181 and 182 which carry follower rollers 183 and 184 riding respectively on the cams 179 and 180. A spring 185 tends to keep the pin 177 at the forward end of the slot 176, but provides a resilient connection which may yield slightly in case the motion of the prefix character is accidently obstructed in any way, thus avoiding breakage of the parts of the prefix character positioning mechanism.

During the rotation of the power shaft 102, the roller 183 rides up the incline of the cam 179 to the high portion thereof while the roller 184 rides down the incline of the cam 180 to the low portion thereof. This moves the arm 178 of the lever to the right or in a clockwise direction, and thus pulls the link 175 rightwardly. The cams are so shaped and so placed on the shaft 102 that this movement of the lever 178 occurs just after the completion of the retracting movement of those type bars which are not to print, as brought out above. Accordingly, the abutment members 68 on the retracted type bars have already been moved rearwardly into the path of travel of the feeler 168 prior to the time that the movement of the lever 178 begins. This is brought out especially in Fig. 16 which is a diagrammatic view illustrating the cam cycle.

In this figure, the line A indicates the beginning of the rotation of the shaft 102, and consequently the beginning of the cycle of operation of the machine, while the line B indicates the end of the rotation, when the shaft has turned through 360°. The line 115 represents the action of the pair of cams 115 and 116, and the inclined portion 115a of this line shows the approximate point at which these cams are effective to move the lever 122 to cause the retracting action to take place, the inclined line 115b representing the return of the lever 122 to normal position near the end of the cycle. In this same figure, the line 179 represents the action of the pair of cams 179 and 180, and the inclined portion 179a shows the approximate point at which the lever 178 is moved to shift the prefix character, while the inclined portion 179b shows the return of these parts to normal position. It will be observed from the diagram that the shifting of the prefix character takes place only after the retracting action has been completed, and that the prefix character is shifted back to normal position before the retracting mechanism releases the retracted type bars.

When the lever 178 is moved by the cams as above described to pull the link 175 rearwardly, this results in counter-clockwise rotation of the bell crank, which moves the fulcrum 172 of the lever 163 in a leftward direction. The throw of this fulcrum is approximately equal to three times the space from the center line of one of the type bars 70 to the center line of the next type bar (but may be slightly greater than this, to cause close positioning of the prefix character by stretching the spring 185 slightly at each actuation). Since the fulcrum is at the mid point of the lever 163, it follows that when the fulcrum is shifted through three steps or units, the front end of the lever 163 may remain stationary and the rear end may move through six steps, or the rear end may remain stationary and the front end may move through six steps, or each end may move through three steps, or either end of the lever 163 may move through any number of steps from one to six while the other end of the lever moves through a number of steps which is complemental thereto to the base 6.

There are seven type bars 70 in the dollar denominations as shown in Figs. 4 and 11, in addition to the two type bars in the cents denominations. It will be remembered however, that the units of dollars type bar is never retracted to sub-zero position, so that the shoulder 168 of the feeler 165 never comes in contact with the abutment 68 on the units of dollars type bar. The feeler accordingly has a maximum movement of six steps or units. If the tens of dollars type bar is retracted, the feeler 168 will remain substantially stationary since it is normally positioned almost in contact with the abutment 68 on the tens of dollars type bar when the latter is retracted. If the tens of dollars type bar is not retracted but the hundreds of dollars type bar is retracted by the retracting mechanism, then the feeler 165 may move through one unit or step until the shoulder 168 comes into contact with the abutment 68 on the hundreds of dollars bar. Similarly, if the type bar 70 in the millions of dollars or highest denomination is the only one retracted, the feeler may move through five steps until the shoulder 168 comes into contact with the retracted abutment 68 on this type bar, and if none of the type bars is retracted, the feeler is permitted to move through its entire range of six steps until it is stopped by the pin 169.

From the complemental movement of the opposite ends of the lever 163 as above described, and from the fact that the feeler 165 is connected to the rear end of this lever, it follows that the front end of the lever will move through a distance complementary to the movement of the feeler 165. Due to the link and lever connection between the front end of the lever 163 and the prefix character 151, this prefix character will likewise be moved through a distance complementary to the movement of the feeler 165, whenever the bell crank 171 is actuated to displace the fulcrum 172.

Accordingly, if the tens of dollars type bar 70 has been retracted so that the feeler 165 is prevented from moving through any substantial distance, actuation of the bell crank 171 by the cams 179 and 180 will cause the prefix character 151 to be moved through a complemental distance which in this case is six steps or units, thus shifting it rightwardly six steps from the position shown in Fig. 4, which would bring it substantially into contact with the left hand side of the type element 81 on the units of dollars type bar 70. Similarly, if the tens of dollars type bar was not retracted and the hundreds of dollars type bar was retracted (together with all the type bars of higher denominations, of course), then the feeler 165 would be permitted to move through one step until it contacted with the abutment 68 on the hundreds of dollars bar, when the bell crank 171 was actuated, and this would cause rightward movement of the prefix character through five steps from the normal position shown in Fig. 4, which would position it adjacent the type element on the tens of dollars type bar.

In a similar manner, no matter which type bar is the lowest one retracted to a sub-zero position, the feeler 165 will move into contact with the abutment 68 on such retracted type bar, and this will result in movement of the prefix character 151 through a complementary distance, positioning it adjacent the type element of the highest denomination which has not been retracted to sub-zero position. If the amount being printed is a million dollars or more, so that none of the type bars is retracted, then the feeler moves through its entire range of six steps, resulting in substantially no movement of the prefix character, which would remain positioned immediately to the left of the type element 81 on the millions of dollars type bar.

Fig. 11 illustrates the parts of the prefix character positioning mechanism when the tens of thousands type bar and the two higher type bars have been retracted, the feeler 165 having been permitted to move through three steps so that the prefix character 151 was moved through the complemental distance of three steps to position it adjacent the thousands type element.

When the parts of the prefix character positioning mechanism return to normal after the printing operation, a stop pin 186 on the arm 173 of the bell crank engages the lever 163 in the manner shown in Fig. 4, and positions the prefix character and the feeler accurately in their normal positions ready for the next actuation.

*Alining mechanism*

After the completion of the setting of the type bars to print the selected digits, the retraction of the type bars of denominations above the highest significant digit, and the positioning of the prefix character, means is brought into play for alining the type bars to correct any slight inaccuracy which may exist in the setting-up mechanism. This means comprises a cam 200 (Figs. 3 and 15) on the power shaft 102, which cam cooperates with a follower roller 201 on a lever 202 pivoted on the shaft 121. Also pivoted on this same shaft is a frame consisting of two parallel side bars 203 mounted to oscillate on the shaft and connected to each other by cross bars 204 at the back and 205 at the front, the latter cross bar having a wedge-shaped upper edge or nose arranged upon upward movement to enter notches 206 formed in the lower surface of each bar 69 fixed to a type bar 70, as shown most clearly in Fig. 3. A spring 207 connects a pin on the lever 202 to a pin 208 on one of the side members 203 of the frame, which pin 208 normally engages a nose on the lever 202 as shown in Fig. 3. During the rotation of the shaft 102, the cam 200 acts upon the roller 201 to shift the lever 202 in a clockwise direction, when viewed as in Fig. 3, which results in clockwise oscillation of the frame members 203, thus raising the bar 205 upwardly into the notches 206 and accurately alining the type bars 70 so that the selected printing types on each bar are brought exactly into proper alinement with each other and with the platen.

Referring now to the diagram in Fig. 16, the line 200 indicates the action of the cam 200 which operates the alining or locking bar, while the inclined portion 200a shows the approximate point at which the mechanism is operated to force the nose 205 into the notches to aline the bars, and the inclined portion 200b indicates the retraction of the alining bar to normal position.

*Platen*

When the set type members 81 have thus been alined, the platen is actuated to effect the actual printing operation. The construction of the platen and of its operating mechanism is best shown in Figs. 3 and 15, with reference to which it will now be described.

The Z-bar 22 supports frame plates 220 which have forward extensions 221 serving as bearings for a shaft 222 extending in a direction transversely of the apparatus. On this shaft 222 there is mounted a platen carrying frame comprising longitudinal members 223 and a transverse member 224, the longitudinal members converging behind the shaft 222 to a single member 225 which carries a follower roller 226 cooperating with a platen operating cam 227.

Pivoted at 228 on the front ends of the frame members 223 is a platen frame 229 extending transversely of the apparatus and having a slot in its top surface in which the platen bar 86 is received. The platen bar is preferably adjustable in its frame 229 by means of adjusting screws 230 so that one end or the other of the platen bar may be raised or lowered if necessary to bring it into accurate contact with the various printing types.

A coiled spring 231 connected to a pin 232 on the member 223 and to a pin 233 on the platen frame 229 tends to pull this platen frame rearwardly or to oscillate it in a clockwise direction about its pivots 228. This tendency is resisted by an adjustable abutment member comprising a screw 234 threaded through an upward extension or lug 235 on a forwardly extending bar 236 fixed to the frame member 221. The end of the screw 234 contacts with a substantially vertical smooth bearing surface or guideway on the platen frame 229, so that as the platen moves up and down toward and away from the printing types, the bearing portion of the platen frame rubs over the end of the screw 234 in contact therewith. By adjusting the screw 234 it is obvious that the platen may be shifted slightly forwardly or rearwardly to bring it accurately into the desired alinement with the printing types, and in whatever position the adjusting screw 234 is placed, the platen frame will nevertheless be maintained in contact therewith by the spring 231.

When it is desired for any reason to render the check printing mechanism inoperative, the platen may be swung in a counter-clockwise direction about its pivots 228 so that it hangs below the pivotal axis instead of extending upwardly therefrom as it normally does when in operative position. This inoperative or non-print position of the platen is shown in dotted lines in Fig. 3. When shifting the platen from its normal position to its non-print position, the tension of the spring 231 will resist displacement until a dead center point is reached, and after passing dead center the spring will aid the shifting of the platen and hold it in some such position as that shown in dotted lines. It is a matter of but an instant to shift the platen from its printing to is non-print position or vice versa. When in non-print position, all of the other parts of the checkwriting mechanism function as usual, and the motion of the platen up and down takes place as usual, but because of the displacement of the platen it does not contact with the paper and move it up against the type or against the printing ribbon, so that no printing occurs.

The top surface of the platen 86 and the printing surfaces of the types may be made smooth, though it is preferable to have them serrated or roughened so that the figures are shredded into the paper.

The cam 227 effects downward movement of the rear ends of the frame 223 and corresponding upward movement of the platen after the alining bar 205 has been actuated. The action is illustrated in the diagrammatic view, Fig. 16, in which the line 227 represents the operation of the platen cam 227, which gradually forces the platen upwardly to the point marked 227a, which is the culmination of the printing operation. From this point onwardly, the platen begins to recede from the printing types, and upon continued rotation of the power shaft 102, the alining bar 205 moves out of the notches 206, the movable prefix character 151 is brought back to its normal position, the dogs 134 of the retracting mechanism return to their normal position, thus releasing the type bars which had been retracted, and then in the latter part of the operating cycle the mechanism of the computing machine returns the forwardly moved denominational members 31 to their rearward or normal position, which brings all of the type bars 70 back to normal or zero position. The parts are then ready to be actuated to print the next check or draft.

Operation

All of the parts of the mechanism have been described in detail above, and a brief résumé of the operation will now be given to aid in understanding the invention.

In operation, let it be assumed that it is desired to write a check in the amount of $3704.47. The operator then depresses the "3" key in the sixth row or denomination of the keys 30 of the computing mechanism, counting from the right hand side, the "7" key in the next or fifth row, the "4" key in the third row, the "4" key in the second row, and the "7" key in the first or right hand row of keys. It will be noted that no key is depressed in the fourth row, since zero is the numeral to be printed in this denomination.

The check or other piece of paper to be printed upon is slid into the machine on the supporting plate 85 in such position that printing will take place on the desired portion of the check, and the trip which controls the clutch between the motor and the shaft 102 is then actuated, so that rotation of the shaft commences and continues through one complete revolution or 360°.

The first part of this revolution of the shaft 102 causes the cam 103 to act upon the follower roller 104 to shift the lever 105, which oscillates the main shaft 100 of the computing machine through the handle 100a, with the same effect as though this shaft were oscillated by the handle 80 shown in the above mentioned patent to Johantgen. This oscillation of the main shaft of the computing machine, through the mechanism described in said patent, releases the denominational members 31 and allows them to be drawn forwardly under the influence of the springs 32.

Since no keys were depressed in the highest four rows or denominations, the denominational members 31 of these denominations will not move forwardly. No type bar 70 is provided for the denominational member 31 of the highest denomination, but type bars are provided for all the other denominations, and accordingly the type bars of the three highest denominations will remain in their normal or zero position for the time being.

The type bars 70 of the sixth denomination from the right hand side of the machine will be moved forward through three steps or increments of motion, to a position in which the numeral 3 on the type member 81 on this type bar will be positioned over the platen 86, this motion taking place as a result of the forward movement of the corresponding denominational member 31, which is allowed to move forwardly under the influence of its spring 32 through three steps until it is stopped by the depressed "3" key. Although the type bar 70 moves through the same number of steps as the denominational member 31, yet its total movement is greater, since the movement is magnified or increased by the action of the lever 55.

The next denominational member, in the fifth or hundreds of dollars denomination, will move forward seven steps, and will cause the corresponding type bar 70 to move forward through seven steps, positioning the "7" type over the platen 86. The next denominational member, in the fourth or tens of dollars denomination, will not move forwardly at all, and its type bars 70 will remain set in zero position.

The three lowest denominational members 31, in the units of dollars, tens of cents, and units of cents, denominations, will be moved forward respectively through four, four, and seven steps, positioning their respective type bars 70 in position to print the numerals "4", "4", and "7".

While this setting up action is taking place, but after it has proceeded far enough so that all of the type bars 70 which are to be moved to printing position have been moved through at least one step or so, the cam 115 shifts the lever 122 to bring the retracting mechanism into operation. When this mechanism begins to move the shaft 129 rearwardly, the tail 133 of the lever 141 is brought away from the stop member 140 and the springs 136 tend to move the dogs 134 downwardly. Since the highest three type members 70 are in zero position at this time, the notches 138 of these type members are in position to be engaged by the dogs 134, which accordingly drop into the notches in the manner shown in Fig. 8. All of the other type bars except that in the tens of dollars denomination have been moved forwardly one or more steps from zero position, however, so that the notches 138 in these bars are not in position to be engaged by the dogs 134, and the dogs simply rest upon the smooth top surfaces of these bars. The tens of dollars bar 70 is in zero position, with its notch 138 beneath its dog 134, but the dog does not enter the notch because the next higher dog, associated with the hundreds of dollars bar, is resting upon the top of this bar, and thus through the extension 139 on the units of dollars dog which overlies the hundreds of dollars dog, prevents the units of dollars dog from dropping into the notch.

Further rotation of the cam 115 oscillates the lever 122 still more, drawing the shaft 129 further rearwardly, so that those dogs 134 which are engaged in notches 138 carry the corresponding type bars 70 rearwardly to a non-printing position, meanwhile stretching the springs 63 and moving the pins 62 to the rear ends of the slots 61.

At about the time that this retraction of the type bars 70 of the highest three denominations is completed, the cam 179 commences its action upon the lever 178, to actuate the prefix character positioning mechanism. The bell crank lever 171 moves the fulcrum 172 of the lever 163 leftwardly, so that the feeler 165 is drawn leftwardly until the abutment portion 168 thereof comes into contact with the retracted abutment 68 associated with the type bars 70 of the tens of thousands of dollars denomination. Through the complemental lever system above described, this results in shifting the prefix character 151 rightwardly substantially into contact with the left hand side of the type on the type bar in the thousands of dollars denomination, bringing this prefix character into the position shown in Figs. 11 and 14.

Next, the cam 200 acts upon the lever 202 to cause the alining bar 205 to enter the appropriate notches in the members 206 on the various type bars, thus accurately alining the printing types ready for the actual printing operation. Then the cam 227 acting upon the roller 226 depresses the rear ends 225 of the platen levers 223, thus raising the forward ends of these levers and carrying the platen 86 upwardly to press the paper against the inked ribbon 87 which is positioned just beneath the set printing types. The upward thrust of the platen against the types is resisted by the cross bar 80 positioned directly in line with the platen and above the type, so that there is no danger of bending or otherwise damaging the types.

The upward motion of the platen 86 results in printing upon the check the digits corresponding to the depressed keys 30, and also whatever words or symbols are provided upon the prefix character and other type members. In the embodiment here shown, as illustrated in Fig. 14, the matter printed upon the check will read "EXACTLY $ 3704 & 47 CTS". This will be printed in comparatively large and conspicuous characters, and preferably shredded into the paper, so that alteration of the amount will be extremely difficult if not impossible. At about the same time that this printing operation on the check takes place, the printing types 45 of the listing mechanism of the adding machine print the same amount on the listing tape or strip on the platen 46, and the same amount is run into the register 35 either additively or subtractively, as may be determined by the manipulation of the appropriate control key of the computing machine in the manner preferred by the operator.

The printing operation upon the check takes place shortly after the completion of the first half of the revolution of the power shaft 102. During the second half of the revolution, the parts return to normal position in an order inverse to that above described in connection with the first half of the revolution. The mechanism of the computing machine resets the keys 30 and returns the denominational members 31 rearwardly to their normal positions, which at the same time brings the type members 70 back to their normal position.

It will be seen that a compact and convenient checkwriting mechanism has been provided which may be used in conjunction with a commercial computing machine, requiring little or no change in the structure of the computing machine. The checkwriting mechanism takes its motion from and is controlled by the computing mechanism. The computing mechanism may be used in all ways in which it could be used if the checkwriting mechanism were not present, and thus the functioning of the computing mechanism is not interfered with in any way by the addition of the checkwriter. When it is desired to use the computing machine for various calculations without printing checks, this may be done simply by turning down the platen 86 to the dotted line position shown in Fig. 3, which will avoid getting ink on the platen or wearing the ribbon and the types, although the other parts of the checkwriter will operate at each actuation of the computing mechanism if the mechanism is driven from the power shaft 102. On the other hand, the computing machine may be operated manually at any time by means of the handle 100a, without operation of the power shaft 102, and when this is done it is not necessary even to turn the platen down, since when the shaft 102 is idle the platen does not move toward or away from the types.

Should it be desired to write a check without making a corresponding addition or subtraction in the register 35, this may be done by depressing the usual "non-add" key of the computing machine, indicated in Fig. 1 by the letters "NA". Use of this key permits a spoiled check, for example, to be duplicated by the checkwriter without throwing out the balance in the register by adding or subtracting the amount of the check twice.

When it is desired to omit the listing of one or more checks by the listing types 45, this may be accomplished by depressing the "non-print" key usually provided on most computing machines, or by providing any conventional and known form of mechanism for preventing printing on the listing mechanism, in case a "non-print" key is not provided originally on the particular computing machine selected for use with the checkwriter.

Checks may be printed alone, without corresponding actuation of either the register 35 or the listing mechanism 45, by depressing both the "non-add" key and the "non-print" key.

It will be seen from the foregoing that a checkwriting mechanism of extremely flexible character has been provided, which may be used in a number of different ways, and which in no way interferes with the normal use of the computing mechanism. The checkwriter may be applied comparatively easily to the computing mechanism, and when so applied it is not unsightly but is of pleasing appearance, since it is inclosed in a base beneath the computing machine and projecting partially in front of the computing machine.

While one embodiment of the invention has been described, it is to be understood that the inventive idea may be carried out in a number of ways. This invention is therefore not to be limited to the precise details shown, but is intended to cover all variations and modifications thereof falling within the spirit of the invention or the scope of the appended claims.

I claim as my invention:

1. In a construction comprising computing mechanism including denominational members movable through predetermined extents, the combination of checkwriting mechanism comprising type members for printing characters upon checks or the like, and means interconnecting said type members and said denominational members, said means including means for moving said type members in accordance with but through greater distances than the movements of said denominational members, so that said type members may print in relatively large characters.

2. The combination with listing mechanism including denominational members movable through predetermined extents, of checkwriting mechanism including type members arranged to print upon checks or the like, and means interconnecting said type members with said denominational members, said means including means for moving said type members in accordance with but through greater distances than the movements of said denominational members, so that said type members may print in relatively large characters.

3. The combination with mechanism including denominational members, of setting instrumentalities for determining the movements of said denominational members, listing types connected to said denominational members for printing characters in accordance with the setting of said setting instrumentalities, type members arranged to print upon checks or the like, and devices including lever means interconnecting said type members and said denominational members so that said type members are moved in accordance with the setting of said setting instrumentalities but through greater distances than the movements of said denominational members or listing types, so that said type members may print substantially larger characters than those printed by said listing types.

4. The combination with mechanism including denominational members, of resilient means tending to move said denominational members through predetermined extents, type members, and means including a resilient connection interconnecting said type members with said denominational members for operating the former from the latter, said resilient connection being stronger than said resilient means.

5. The combination with mechanism including movable denominational members, of setting instrumentalities arranged to be selectively actuated to determine the extent of movement of said denominational members, resilient means tending to move said denominational members through the extent permitted by said setting instrumentalities, type members, and a connection including resilient means tending to move said type members in accordance with movements of said denominational members, said last named resilient means being stronger than said first named resilient means so that accidental obstruction of movement of said type members will cause corresponding stoppage of movement of said denominational members.

6. The combination with a movable denominational member, of stop means for limiting the movement of said denominational member in one direction, a type member, an operative connection between said type member and said denominational member, said operative connection including means for moving said type member in one direction in accordance with the movement of said denominational member and for permitting movement of the type member in an opposite direction while said denominational member is held against movement by said stop means, and mechanism for moving said type member in said opposite direction.

7. The combination with a denominational member movable through predetermined extents, of a type member, mechanism connecting said denominational member to said type member to move the latter in accordance with movements of the former, and mechanism for shifting said type member to an ineffective non-print position without corresponding movement of said denominational member.

8. The combination with a denominational member movable from a normal zero position to a plurality of other positions corresponding to digits from 1 to 9 inclusive, of a type member for printing characters from 0 to 9 inclusive, mechanism connecting said denominational member with said type member to set the latter in accordance with the position to which the denominational member is moved to print numbers corresponding with the setting of the denominational member, and means operable only when said denominational member is in zero position for shifting said type member to ineffective non-print position without shifting said denominational member.

9. The combination with denominational members each having a zero position and each being movable from said zero position to any selected one of a plurality of positions corresponding to digits 1 to 9 inclusive, of type members each carrying printing type for printing characters from 0 to 9 inclusive, means connecting each of said denominational members to one of said type members to move the latter in accordance with the movements of the former, and means for automatically moving to a non-print position, all of said type members of denominations higher than the highest denomination which has been moved from zero position to a position corresponding to a significant digit, said means being ineffective to shift said type members of lower denomination than said highest denomination having a significant digit and also ineffective to shift the denominational members.

10. In a checkwriter, the combination with a plurality of denominational members selectively movable in accordance with characters to be printed, of a prefix character, abutment portions associated with said denominational members, a feeler device movable into engagement with one of said abutment portions, and means for shifting said prefix character through a distance inversely proportional to the extent of movement of said feeler device.

11. In a checkwriter, the combination with a plurality of denominational members movable in accordance with characters to be printed, of a prefix character, an abutment portion associated with each of said denominational members, a lever, means connecting one end of said lever to said prefix character, a feeler arranged to cooperate with one of said abutment portions and operatively connected to the other end of said lever, and means for moving an intermediate portion of said lever so that said prefix character will be positioned in accordance with the particular abutment portion with which said feeler cooperates.

12. In a checkwriter, the combination with a plurality of denominational members selectively movable in accordance with characters to be printed, of an abutment portion associated with each of said members, a feeler, mechanism for shifting the abutment associated with the denominational member next above the highest significant character to be printed into the path of travel of said feeler, a shiftable prefix character, and means including a lever system connecting said feeler to said shiftable prefix character to position said character to print adjacent the highest significant denominational character to be printed.

13. A checkwriter comprising, in combination, a plurality of denominational members selectively movable in accordance with characters to be printed, a movable feeling device, means for limiting the movement of said feeling device in accordance with the highest significant denominational character to be printed, a lever operatively connected to said feeling device, a fulcrum for said lever, means for moving said fulcrum through a substantially fixed range of movement, a link connected to another portion of said lever, a reversing lever connected to said link, and a shiftable prefix character arranged to be moved by said reversing lever into position to print adjacent the highest significant denominational character to be printed.

14. In a checkwriter, the combination with a movable member, of a pin on said member, a type element, a notch adjacent one end of said type element for cooperation with said pin, and screw means connecting another point of said type element to said member, to secure said type element and said member together.

15. In a checkwriter, the combination with a movable member of a type element for cooperation with said movable member, said type element having a groove arranged to receive therein a portion of said movable member, a notch in said type element at one end thereof, a pin on said movable member engaging said notch, and releasable means for holding the opposite end of said type element in fixed position relative to said movable member.

16. In a checkwriter, the combination with a movable member selectively settable in accordance with characters to be printed, of an elongated type element mounted upon said member, a casing substantially enclosing said member and said type element, said member being shiftable to a position in which one end of said type element projects from and is accessible from outside of said casing, and means operable wholly from said projecting end of said type element for securing said type element to or releasing it from said movable member.

17. In a printing mechanism, the combination with type members, of a platen for cooperation therewith, adjustable alining means for holding said platen in alinement in a direction transverse to the printing line and parallel to the plane of the printing line, and resilient means tending to move said platen into contact with said adjustable alining means.

18. In a printing mechanism, the combination with printing types, of a platen carrying member movable relative to said types, a platen mounted on said carrying member for movement relative thereto from a position for cooperation with said types to a non-print position out of cooperation therewith, and resilient means for holding said platen in either of said positions in which it is placed.

19. In a construction including combined checkwriting and computing mechanism for printing upon checks the same amounts set up in the computing mechanism and comprising a main operating shaft for the computing mechanism, the combination of a shaft for operating parts of the checkwriting mechanism, means for turning the main shaft of the computing mechanism independently of the operating shaft for the checkwriting mechanism, and mechanism for interconnecting the computing mechanism shaft and the checkwriting mechanism shaft to operate the former from the latter.

WALTER B. PAYNE.